I. W. FOLTZ.
DRILL.
APPLICATION FILED MAY 15, 1916.

1,240,553.

Patented Sept. 18, 1917.

Witness
George C. Schultz

Inventor
Ira W. Foltz
By Rummler & Rummler
Attys.

UNITED STATES PATENT OFFICE.

IRA W. FOLTZ, OF CHICAGO, ILLINOIS.

DRILL.

1,240,553.  Specification of Letters Patent.  Patented Sept. 18, 1917.

Application filed May 15, 1916. Serial No. 97,687.

*To all whom it may concern:*

Be it known that I, IRA W. FOLTZ, a citizen of the United States of America, and a resident of Chicago, county of Cook, and State of Illinois, have invented certain new and useful Improvements in Drills, of which the following is a specification.

This invention relates to drills of the type described in my Patent No. 1,076,950 of March 28, 1916.

The objects of the invention are to provide a tool for making circular cuts, but of more simplified construction and requiring fewer operations in the production thereof than is required in the making of the drill described in said patent and of prior types of drills of the same general class; and to provide improved means for radially adjusting and maintaining in adjusted position the cutters of the drill whereby circular cuts of any desired diameter may be made.

An illustrative embodiment of this invention is shown in the accompanying drawings, in which—

Figure 1:
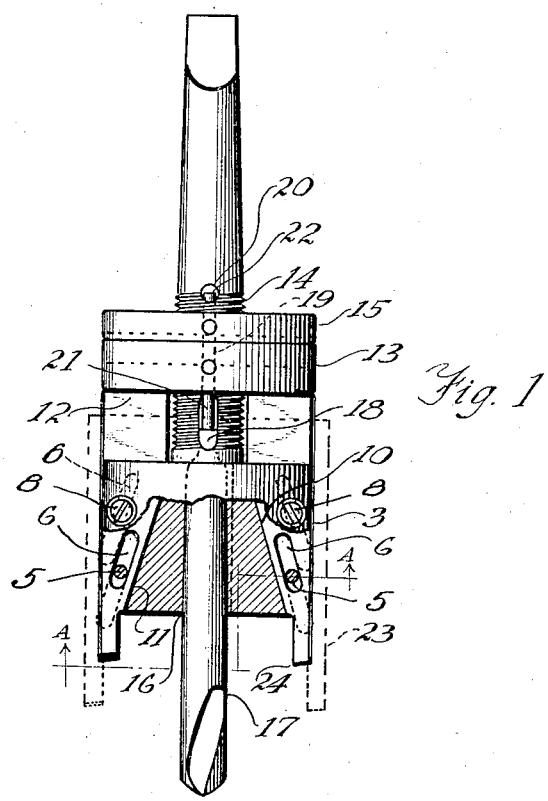
Figure 1 shows the drill in side elevation and partly in section.
Figure 2:
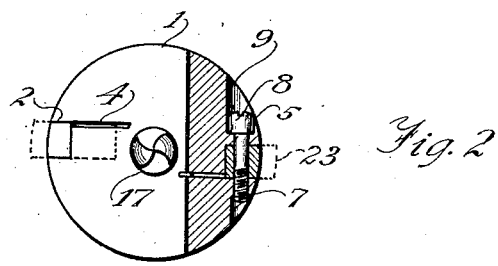
Fig. 2 is a sectional view taken on the line A—A of Fig. 1.

The drill shown in the drawings is designed for making holes of various diameters in boiler plates or through a plurality of spaced plates such as occur in ship constructions. The drill is also intended to be operated by small pneumatically or electrically driven motors in order that cuts may be made where there is limited space and after the plates operated upon are installed in permanent structures.

Boring large holes by ordinary metal drills requires much time and labor if the drill is so constructed as to cut away all stock from the center to the circumference of the hole. In such case it is also necessary to be provided with a large assortment of drills in order to cut holes of different sizes.

The present drill as shown in the drawings comprises a cylindrical head 1 provided with a plurality of longitudinal slots 2 in which are adjustably mounted cutter blades 3. A saw cut 4 extends inwardly from slots 2 in order to give more or less resilience to the body portion of the drill so that the same may be clamped against the sides of cutters 3 by means of bolts 5. These bolts pass through inclined slots 6 in cutters 3 and at their inner ends 7 are in threaded engagement with the body portion of the drill. The heads 8 of the bolts are located in counter sinks 9.

The cutting blades 3 are provided with surfaces 10 which are inclined with respect to the axis of the body portion 1 and the body portion is likewise provided with coöperating inclined surfaces 11. The slots 6 in the cutters are inclined with respect to the length of the cutters to correspond with the inclination of surfaces 10 and 11. By this construction when the bolts 5 are loosened and the cutters 3 are forced downwardly with respect to the body portion 1, the inclined surfaces 10, acting on surfaces 11 and also the inclined slots 6 acting on the bolts 5 cause the cutters to be projected radially with respect to the body portion of the drill while maintaining good contact with the inclined surfaces 11 and the bolts 5. For the purpose of so adjusting cutters 3 the upper ends of the latter are provided with horizontal surfaces 12 for engaging with a flat fixed nut 13 in threaded engagement with a shank 14 integral with and extending upwardly from the body portion of the drill. This shank is also suitably tapered and formed at its upper end for engagement with ordinary drill chucks. An additional locking nut 15 is provided to secure the nut 13 in its adjusted position. The body portion 1 is provided with an axial recess 16 for receiving a centering tool or drill 17. The shank 14 has a transverse drift slot 18 at the upper end of the recess or bore 16 and the drill 17 may be driven out of the tool by means of a drift pin or wedge inserted in this slot, but since slot 18 may be inaccessible in some adjustments of the cutters 3, a small hole 19 is drilled upwardly from slot 18 into the shank 14. The hole 19 communicates with a transverse hole 20 and a pin 21 located in the hole 19 has a slightly enlarged head 22 extending into the hole 20. The body portion of pin 21 loosely fits in the hole 19 and in order to insert the pin 21 into the hole 19, it is necessary to drive its enlarged head through the same. The enlarged head of the pin prevents the same from falling through the bore 16 when drill 17 is removed. It may be seen that by inserting any pointed or wedge-shaped tool into the hole 20, pin 21 may be forced downwardly sufficiently to loosen the drill 17. The latter may therefore be replaced without necessitating a readjustment of the cutter blades.

The outer edges 23 of the cutter blades are slightly inclined inwardly from the bottom to the top thereof in order to provide clearance between the tool and the stock operated upon when the tool passes through a succession of holes in spaced plates. It is necessary to sharpen only the lower ends 24 of the cutters.

In the operation of the device, assuming that the tool is rotated through means engaging shank 14, drill 17 will first cut a small centering or pilot hole in the material being operated upon. Thus during the further operation of the device while the cutters 3 are in action the tool is steadied both by the bearings of the driving motor and the bearing provided by drill 17, and as a consequence cuts an absolutely true circular hole.

The cutters 3 may be adjusted radially with respect to the body portion of the tool by loosening bolts 5 and then adjusting nuts 13 and 15 to either force the cutters downwardly and outwardly along the inclined surfaces 11 or permit their being pushed upwardly and inwardly to the desired position. In whatever position the cutters are placed, their inclined surfaces 10 maintain contact with the surfaces 11, and also the edges of slot 6 maintain contact with bolts 5, and in this manner any undesirable play between the cutters and support is avoided. The cutters are clamped in their adjusted position by tightening bolts 5 which serves to draw the metal of the body portion 1 into tight contact with the sides of the cutters. The saw cuts 4 permit the latter action to take place without much resistance, while not materially weakening the body portion 1.

In the drill described in Patent No. 1,176,950 above mentioned, the cutters were provided with upper edges which were inclined with respect to the axis of the device, and it was likewise necessary to provide a conical nut for coöperating with the upper edges of the cutters. Such arrangement required special machine operations which are unnecessary with the present construction. Also in the present case the knives may be more readily clamped in adjusted position due to the saw cuts 4. The extended drift slot 19 also permits replacement of the centering drill 17 without unscrewing the nuts 13 and 15 and thereby loosening the previous adjustment of the cutters.

From the foregoing, it may be seen that this invention provides a drill which is free from vibration during its operation, is adjustable, may cut through a number of parallel plates, and requires comparatively less power than ordinary twist drills.

Although but one specific embodiment of this invention is herein shown and described, it will be understood that the construction shown may be altered and details omitted without departing from the spirit of the invention as described by the following claims.

I claim:

A device of the class described, comprising a body portion provided with an axial bore therein for the reception of a drill, a shank integral with said body portion and extending outward therefrom in alinement with said axial bore, said body portion having a longitudinal slot therein at one side, said slot being formed to provide side walls and an inclined inner wall, a cutting tool mounted in said slot and having a flat surface extending at substantially right angles to the axis of said body portion, said cutting tool having a surface inclined with respect to the axis of said body portion for coacting with the inclined surface of said body portion, said cutting tool being provided with a slot disposed substantially parallel to said inclined surfaces, means mounted on said body portion and extending through said inclined slot for clamping said cutting tool between the walls of said slot, and a flat-faced nut in threaded engagement with said shank for bearing against the flat face of said cutting tool whereby the tool may be adjusted axially and radially of said body portion.

Signed at Chicago this 12th day of May, 1916.

IRA W. FOLTZ.

Copies of this patent may be obtained for five cents each, by addressing the "Commissioner of Patents, Washington, D. C."